US011799815B2

(12) United States Patent
Tian et al.

(10) Patent No.: US 11,799,815 B2
(45) Date of Patent: *Oct. 24, 2023

(54) GROUP MANAGEMENT METHOD, TERMINAL, AND STORAGE MEDIUM

(71) Applicant: Tencent Technology (Shenzhen) Company Limited, Shenzhen (CN)

(72) Inventors: Yuan Tian, Shenzhen (CN); Lin Li, Shenzhen (CN); Feng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,693

(22) Filed: Sep. 1, 2022

(65) Prior Publication Data
US 2022/0417198 A1 Dec. 29, 2022

Related U.S. Application Data

(63) Continuation of application No. 17/037,394, filed on Sep. 29, 2020, now Pat. No. 11,470,033, which is a
(Continued)

(30) Foreign Application Priority Data

Jul. 23, 2015 (CN) .......................... 201510440016.9

(51) Int. Cl.
*H04L 51/224* (2022.01)
*H04L 67/50* (2022.01)
*H04L 51/04* (2022.01)

(52) U.S. Cl.
CPC ............ *H04L 51/224* (2022.05); *H04L 51/04* (2013.01); *H04L 67/535* (2022.05)

(58) Field of Classification Search
CPC ..... H04L 67/535; H04L 51/224; H04L 51/04; G06Q 10/109
See application file for complete search history.

(56) References Cited

U.S. PATENT DOCUMENTS 5,880,731 A * 3/1999 Liles ...................... G06F 3/0481
345/473
7,454,781 B2 * 11/2008 Tachizawa .............. H04L 67/54
726/3
(Continued)

FOREIGN PATENT DOCUMENTS

| CN | 101662830 A | 3/2010 |
| CN | 102638358 A | 8/2012 |
(Continued)

OTHER PUBLICATIONS

Fahad Saleem, "Leave WhatsApp Group Secretly Without Notification and Delete WhatsApp Group Without Leaving Group [Guide]", Innov8tiv, Mar. 12, 2015, 14 pgs., Retrieved from the Internet: https://innov8tiv.com/leave-whatasapp-group-secretly-without-notification-and-delete-whatsapp-group-without-leaving-group-guide/.
(Continued)

*Primary Examiner* — Mahran Y Abu Roumi
(74) *Attorney, Agent, or Firm* — Morgan, Lewis & Bockius LLP

(57) ABSTRACT

Disclosed is a chat group management method, including: detecting a message receiving mode corresponding to a chat group; obtaining a degree of interest of a user for chat group messages and an activity degree of the user in the chat group in accordance with a determination that the message receiving mode corresponding to the chat group is a mute-notification receiving mode; determining an importance ranking for the chat group according to the degree of interest and the activity degree; and updating the chat group's
(Continued)

position among a plurality of chat groups in accordance with the importance ranking.

18 Claims, 8 Drawing Sheets

Related U.S. Application Data continuation of application No. 15/804,845, filed on Nov. 6, 2017, now Pat. No. 10,826,860, which is a continuation-in-part of application No. PCT/CN2016/082387, filed on May 17, 2016.

(56) References Cited

U.S. PATENT DOCUMENTS

| | | | | |
|---|---|---|---|---|
| 8,954,100 | B2* | 2/2015 | Toksvig | H04L 51/58 |
| | | | | 455/466 |
| 9,514,435 | B2* | 12/2016 | Nguyen | G06Q 10/10 |
| 10,826,860 | B2 | 11/2020 | Tian et al. | |
| 2003/0026240 | A1* | 2/2003 | Eyuboglu | H04L 12/185 |
| | | | | 370/349 |
| 2003/0065788 | A1* | 4/2003 | Salomaki | G06Q 10/06 |
| | | | | 709/227 |
| 2003/0227479 | A1* | 12/2003 | Mizrahi | A63F 13/10 |
| | | | | 715/753 |
| 2006/0117380 | A1* | 6/2006 | Tachizawa | H04L 51/04 |
| | | | | 726/4 |
| 2006/0242232 | A1* | 10/2006 | Murillo | H04L 12/1813 |
| | | | | 709/204 |
| 2007/0061405 | A1* | 3/2007 | Keohane | G06Q 10/109 |
| | | | | 709/207 |
| 2008/0034040 | A1* | 2/2008 | Wherry | G06Q 10/107 |
| | | | | 709/204 |
| 2008/0109406 | A1* | 5/2008 | Krishnasamy | H04L 51/04 |
| 2008/0263157 | A1* | 10/2008 | Bhogal | G06Q 10/107 |
| | | | | 709/206 |
| 2009/0059922 | A1* | 3/2009 | Appelman | H04L 51/04 |
| | | | | 370/390 |
| 2010/0180217 | A1* | 7/2010 | Li | G06F 16/9535 |
| | | | | 707/769 |
| 2010/0205539 | A1* | 8/2010 | Gestsson | H04M 3/42365 |
| | | | | 715/752 |
| 2010/0205541 | A1* | 8/2010 | Rapaport | G06Q 10/10 |
| | | | | 715/753 |
| 2010/0262666 | A1* | 10/2010 | Kalu | G06Q 10/107 |
| | | | | 709/206 |
| 2011/0041082 | A1* | 2/2011 | Nguyen | G06Q 10/10 |
| | | | | 715/752 |
| 2011/0231493 | A1* | 9/2011 | Dyor | H04L 51/222 |
| | | | | 709/206 |
| 2012/0059896 | A1* | 3/2012 | Li | H04L 51/04 |
| | | | | 709/206 |
| 2012/0231770 | A1* | 9/2012 | Clarke | G06F 3/048 |
| | | | | 455/414.1 |
| 2012/0290950 | A1* | 11/2012 | Rapaport | H04L 51/52 |
| | | | | 715/753 |
| 2013/0036112 | A1* | 2/2013 | Poon | G06Q 50/01 |
| | | | | 707/723 |
| 2013/0115981 | A1* | 5/2013 | Toksvig | H04L 51/58 |
| | | | | 455/466 |
| 2013/0165171 | A1 | 6/2013 | Pai et al. | |
| 2013/0311579 | A1* | 11/2013 | Cohen | H04L 47/2433 |
| | | | | 709/206 |
| 2013/0346886 | A1* | 12/2013 | Cauchois | H04L 51/046 |
| | | | | 715/758 |
| 2014/0047049 | A1* | 2/2014 | Poston | H04L 12/1822 |
| | | | | 709/206 |
| 2014/0143684 | A1* | 5/2014 | Oh | G06F 3/04883 |
| | | | | 715/752 |
| 2014/0173430 | A1* | 6/2014 | Clavel | G06F 3/0481 |
| | | | | 715/716 |
| 2014/0173467 | A1* | 6/2014 | Clavel | H04L 12/1822 |
| | | | | 715/758 |
| 2015/0288640 | A1* | 10/2015 | Lee | H04L 51/224 |
| | | | | 709/206 |
| 2015/0334069 | A1* | 11/2015 | Winston | H04M 1/72436 |
| | | | | 709/206 |
| 2015/0341903 | A1* | 11/2015 | Jeong | H04W 4/80 |
| | | | | 455/458 |
| 2016/0065509 | A1* | 3/2016 | Yang | G06F 3/0482 |
| | | | | 715/752 |
| 2016/0080552 | A1* | 3/2016 | Keating | G06F 1/1686 |
| | | | | 455/550.1 |
| 2016/0359771 | A1* | 12/2016 | Sridhar | H04L 51/02 |
| 2016/0381226 | A1 | 12/2016 | Messenger et al. | |
| 2017/0171121 | A1* | 6/2017 | Zhang | H04L 67/75 |
| 2017/0187653 | A1* | 6/2017 | Saito | H04L 51/224 |
| 2018/0032997 | A1* | 2/2018 | Gordon | G06Q 30/0269 |
| 2018/0063061 | A1 | 3/2018 | Tian et al. | |
| 2019/0037038 | A1* | 1/2019 | Ben-Yoseph | H04L 67/75 |
| 2021/0014189 | A1 | 1/2021 | Tian et al. | |

FOREIGN PATENT DOCUMENTS

| | | |
|---|---|---|
| CN | 103401763 A | 11/2013 |
| CN | 105024835 A | 11/2015 |
| KR | 20120069951 A | 6/2012 |
| KR | 20150041707 A | 4/2015 |
| WO | WO 2006048759 A1 | 5/2006 |

OTHER PUBLICATIONS

Tencent Technology, ISRWO, PCT/CN2016/082387, Aug. 17, 2016, 9 pgs.

Tencent Technology, IPRP, PCT/CN2016/082387, Jan. 23, 2018, 8 pgs.

\* cited by examiner

GROUP MANAGEMENT METHOD, TERMINAL, AND STORAGE MEDIUM

CROSS REFERENCE TO RELATED APPLICATIONS

This application is a continuation application of U.S. patent application Ser. No. 17/037,394, entitled "GROUP MANAGEMENT METHOD, TERMINAL, AND STORAGE MEDIUM", filed Sep. 29, 2020, which is a continuation application of U.S. patent application Ser. No. 15/804,845, entitled "GROUP MANAGEMENT METHOD, TERMINAL, AND STORAGE MEDIUM", filed Nov. 6, 2017, which is a continuation-in-part application of PCT/CN2016/082387, entitled "GROUP MANAGEMENT METHOD AND TERMINAL, AND STORAGE MEDIUM" filed on May 17, 2016, which claims priority to Chinese Patent Application No. 201510440016.9, filed with the State Intellectual Property Office of the People's Republic of China on Jul. 23, 2015, and entitled "GROUP MANAGEMENT METHOD AND APPARATUS", all of which are incorporated herein by reference in their entirety.

FIELD OF THE TECHNOLOGY

The present disclosure relates to the field of Internet technologies, and in particular, to a chat group management method, a terminal, and a storage medium.

BACKGROUND OF THE DISCLOSURE

Currently, some frequently-used instant messaging tools have a chat group function, so that one-to-many or many-to-many communication and exchange may be implemented by using a chat group (including a cluster and a discussion chat group). Due to convenience in communication among many people in a chat group, a user may be added to multiple chat groups. However, there are many members in a chat group. Consequently, a quantity of messages received by the chat group is relatively large. If the user is not interested in the chat group, or the user is not familiar with other members of the chat group, numerous messages received by the chat group bring about valueless information disturbance to the user, and a pressure on a server is increased because the chat group receives numerous valueless messages.

SUMMARY

A chat group management method, a terminal, and a storage medium that are disclosed in this application resolve one or more problems in the background of the disclosure.

A chat group management method, including:
  detecting a message receiving mode corresponding to a chat group;
  obtaining a degree of interest of a user for chat group messages and an activity degree of the user in the chat group if the message receiving mode corresponding to the chat group is a mute-notification receiving mode;
  determining, according to the degree of interest and the activity degree, whether to trigger guidance to leave the chat group;
  displaying guidance information about leaving the chat group if it is determined to trigger guidance to leave the chat group, and leaving the chat group when a determined instruction to leave the chat group is received by using an I/O device.

A terminal, including a memory and a processor, the memory storing an instruction, and the processor performing the following steps when the instruction is executed by the processor: detecting a message receiving mode corresponding to a chat group;
  obtaining a degree of interest of a user for chat group messages and an activity degree of the user in the chat group if the message receiving mode corresponding to the chat group is a mute-notification receiving mode;
  determining, according to the degree of interest and the activity degree, whether to trigger guidance to leave the chat group;
  displaying guidance information about leaving the chat group if it is determined to trigger guidance to leave the chat group, and leaving the chat group when a determined instruction to leave the chat group is received by using an I/O device.

One or more computer non-transitory the storage mediums storing computer readable instructions, one or more performing the following steps when the computer readable instructions are executed by the one or more processors:
  detecting a message receiving mode corresponding to a chat group;
  obtaining a degree of interest of a user for chat group messages and an activity degree of the user in the chat group if the message receiving mode corresponding to the chat group is a mute-notification receiving mode;
  determining, according to the degree of interest and the activity degree, whether to trigger guidance to leave the chat group;
  displaying guidance information about leaving the chat group if it is determined to trigger guidance to leave the chat group, and leaving the chat group when a determined instruction to leave the chat group is received by using an I/O device.

Details of one or more embodiments of the present disclosure are described in the accompanying drawings and the following description. Other features, objectives, and advantages of the present disclosure will be apparent from the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
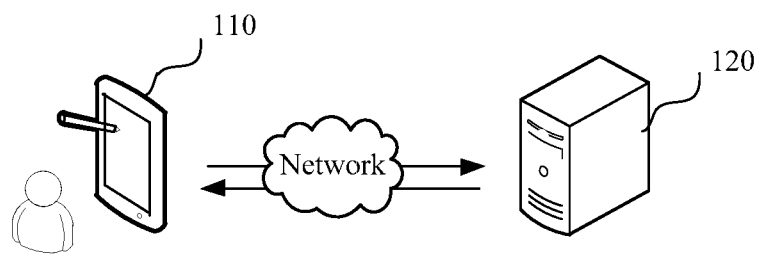
FIG. 1 is a diagram of an application environment of a chat group management method according to some embodiments.

A chat group management method provided in the embodiments of this application may be applied to an environment shown in FIG. 1. Referring to FIG. 1, a terminal 110 interacts with a server 120 by using a network. A platform tool having a chat group function, for example, an instant messaging tool, a social networking service (SNS) community network tool, a microblog application, or a forum, runs in the terminal 110, and a chat group may be created by using the chat group function provided by the platform tool. The platform tool may implement information exchange among many people by using the chat group. The server 120 stores a chat group identifier and a user identifier of a corresponding user joining in the chat group. The server 120 further stores reference information between each user in the chat group and the chat group, including setting information entered by the user for the chat group (for example, setting the chat group to a mute-notification receiving mode or not and name remarks of members in the chat group), messages sent in the chat group, staying time after entering a chat group message display interface, and the like.

Further, the terminal 110 may detect a message receiving mode corresponding to the chat group according to the setting information entered by the user for the chat group. If the message receiving mode corresponding to the chat group is the mute-notification receiving mode, the terminal 110 obtains reference information from the server 120, to obtain a degree of interest of the user for chat group messages and an activity degree of the user in the chat group, and further determines, according to the degree of interest and the activity degree, whether to actively guide the user to leave the chat group. If it is determined to trigger guidance to leave the chat group, leaving the chat group is implemented by receiving setting by the user by using a corresponding user interface. The terminal 110 may be any device running a platform tool having a chat group function, for example, a personal computer, a notebook computer, a smartphone, a tablet computer, and a portable wearable device, which is not enumerated herein.

Figure 2:
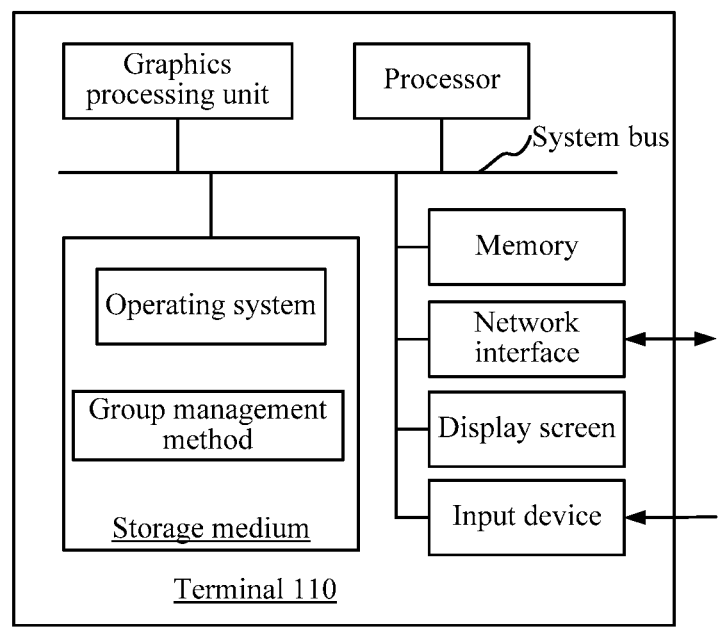
FIG. 2 is a composition structure diagram of a terminal in FIG. 1.

Further, FIG. 2 shows an internal structure of the terminal 110. The terminal 110 includes a processor, a graphics processing unit, a storage medium, a memory, a network interface, a display screen, and an input device that are connected by using a system bus. The storage medium stores an operating system, and further stores a computer executable instruction. When the computer executable instruction is executed by the processor, a chat group management method may be implemented. The processor is configured to provide computing and control capabilities, to support running of the entire terminal 110. The graphics processing unit in the terminal 110 is configured to provide at least drawing capability for displaying an application operation interface, for example, drawing an application interface to guide a user to leave a chat group. The memory is configured to provide an environment for running of a chat group management apparatus in the storage medium. The display screen is configured to display icons and interfaces of various applications, for example, display a chat group message display interface or a switch for leaving the chat group. The input device is configured to receive a command or data entered by the user, for example, receive setting information and the like that are entered by the user. The network interface of the terminal 110 is configured to establish a network connection with the server 120 and communicates with the server 120, for example, receive data sent by the server 120 and send the setting information entered by the user for the chat group to the server 120 for storage. For the terminal 110 with a touchscreen, both the display screen and the input device may be touchscreens. It may be understood that, the structure shown in FIG. 2 is merely a block diagram of part of structure related to the solutions in this application, but does not limit the terminal to which the solutions in this application are applied. Specifically, the terminal may include more or less parts than those shown in the figure, or a combination of some parts, or may have a different part configuration.

Figure 3:
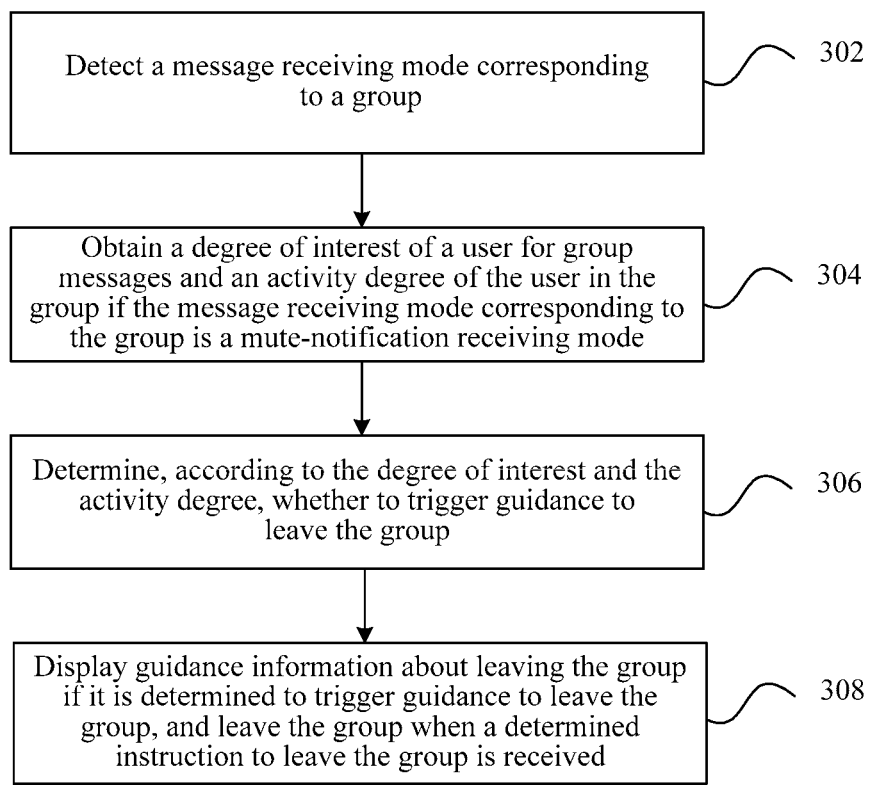
FIG. 3 is a flowchart of a chat group management method according to some embodiments.

As shown in FIG. 3, in an embodiment, a chat group management method is provided. For example, the method is applied to the terminal shown in FIG. 1, including the following steps:

Operation 302. Detect a message receiving mode corresponding to a chat group.

The message receiving mode may be set by using a setting interface corresponding to the chat group, to determine that the terminal receives a message sent by a member in the chat group in what form, including a notification receiving mode and a mute-notification receiving mode. The notification receiving mode means that the terminal gives a notification by using a prompt tone and receives a message when receiving the message sent by another member in the chat group. The mute-notification receiving mode means that the terminal receives a message without enabling the prompt tone when receiving a message sent by another member in the chat group. Therefore, the mute-notification receiving mode is also referred to as a mute receiving mode. Because a quantity of messages in the chat group is relatively large, for a chat group in which the user does not need to view messages, a user may set the message receiving mode corresponding to the chat group to the mute-notification receiving mode.

Operation 304: Obtain a degree of interest of a user for chat group messages and an activity degree of the user in the chat group if the message receiving mode corresponding to the chat group is the mute-notification receiving mode.

In this embodiment, if the message receiving mode corresponding to the chat group is the mute-notification receiving mode, it indicates that, for the user, the chat group does not have a high value and has information disturbance. The terminal further obtains the degree of interest of the user for chat group messages and the activity degree of the user in the chat group.

The degree of interest of the user for chat group messages reflects whether the user is interested in messages sent by members in the chat group. Specifically, this may be determined according to whether the user cancels the mute-notification receiving mode of the chat group and enables a notification receiving mode. If the user cancels the mute-notification receiving mode of the chat group, it indicates that the user wishes to view, in a timely manner, messages sent by members in the chat group. That is, the user is interested in the messages sent by the members in the chat group. In addition, whether the user is interested in the messages sent by the members in the chat group may also be determined according to staying time after entering a chat group message display interface whenever the user opens the chat group. The user is more interested in the messages sent by the members in the chat group if the staying time after entering the chat group message display interface is longer. The activity degree of the user in the chat group may be determined according to a quantity of messages sent by the user in the chat group. When the user sends a larger quantity of messages in the chat group, it indicates that the activity degree of the user in the chat group is higher.

In some embodiments, the degree of the user's interest in the chat group and the activity degree of the user in the chat group can be measured by obtaining a quantity of messages sent by the user to the chat group within a predetermined period of time (e.g., a day or a week), and determining a number of visits the user browses the chat group and a corresponding total amount of time the user spends browsing the chat group within the predetermined period of time. In some embodiments, the measurement can be at the level of individual user visits to the chat group. For example, a staying time of each user visit to the chat group is compared with a time threshold (e.g., 30 seconds or one minute) and a number of visits whose associated staying time is less than the time threshold is recorded for subsequent uses.

Operation 306. Determine, according to the degree of interest and the activity degree, whether to trigger guidance to leave the chat group.

In this embodiment, the terminal obtains the degree of interest of the user in the chat group. If it is determined that the user is not interested in the chat group messages, guidance to leave the chat group may be triggered. The terminal may alternatively obtain the activity degree in the chat group. If the activity degree of the user in the chat group is not high, guidance to leave the chat group may also be triggered.

Operation 308: Display guidance information about leaving the chat group if it is determined to trigger guidance to leave the chat group, and leave the chat group when a determined instruction to leave the chat group is received.

Specifically, when it is determined that guidance to leave the chat group needs to be triggered, on an application interface of the terminal, a prompt box may pop up to display the guidance information about leaving the chat group, and a switch for leaving the chat group is provided to receive the determined instruction to leave the chat group. Leave the chat group when the determined instruction to leave the chat group is received, that is, terminating a binding relationship between the user and the chat group, and this is updated to a server.

In this embodiment, when a message receiving mode corresponding to a chat group is a mute-notification receiving mode, it indicates that a user does not wish to receive messages from the chat group in a timely manner. Whether the user needs to be guided to leave the chat group is further determined according to a degree of interest of the user for the chat group messages and an activity degree of the user in the chat group, so that the user is actively guided to leave the chat group by means of a guidance manner. In this way, information disturbance to the user resulted from a large quantity of valueless messages is avoided, and a pressure of a server is also reduced.

As noted above, a user's instant messaging tool may have too many chat groups, some of which have a large number of members (e.g., several hundred). If any member of a chat group submits a new message to the chat group, the chat group is then automatically pushed to the top of the terminal's screen even if the user has no interest in opening the chat group for browsing any of the new incoming messages. If there are too many of such chat groups in the user's instant messaging account, they may occupy the entire screen of the terminal such that the user may easily miss those critical messages that the user does not want to miss because they are not given enough priority to stay on the screen of the terminal. On the other hand, leaving a chat group if the user has not paid enough attention to the chat group is a dramatic approach and sometimes irreversible (e.g., some chat groups are by invitation-only and some chat groups have a limit on the total number of members). Therefore, it is desirable to move those chat groups for which the user has turned on the mute-notification receiving mode to a dedicated list of chat groups that do not occupy a large space on the screen. The user can still visit these chat groups every now and then by selecting the list of chat groups. Based on the degree of a user's interest in a particular chat group and the user's activities in the chat group, the terminal may move the chat group to a more active status (e.g., pulling it out of the list of chat groups for which the user has turned on the mute-notification receiving mode) or leaving the chat group completely.

In some embodiments, the terminal determines an importance ranking for the chat group according to the degree of interest and the activity degree and then updates the chat group's position among a plurality of chat groups in accordance with the importance ranking. Note that the importance ranking measures the likelihood of the user visiting the chat group when it has received a new message from one of its members. For example, the importance ranking may be determined by a weighted average of the degree of user's interest and the user' activity degree at the chat group. Note that the importance ranking is a dynamic parameter that varies over time. There are multiple predefined threshold levels for the importance ranking. For example, when the importance ranking is lower than a first predefined threshold level (which is a low threshold level), it is assumed that the user has lost his interest in the chat group completely. In response, the terminal displays guidance information about leaving the chat group and removes the chat group from the plurality of chat groups in response to an instruction to leave the chat group received by using an I/O device of the computing device. On the other hand, when the importance ranking is higher than a second predefined threshold level (which is presumably a level much higher than the first predefined threshold level), it is assumed that the user has significantly increased his interested in the chat group and it is therefore worthwhile pulling the chat group out of the list of chat groups for which the user has turned on the mute-notification receiving mode. Therefore, the terminal may remove the mute-notification receiving mode from the chat group and set the message receiving mode corresponding to the chat group to be a notification receiving mode. By doing so, the user will be easily notified when there is a new message arriving at the chat group. Finally, even when the importance ranking is lower than the second predefined threshold level and higher than the first predefined threshold level, the terminal may move the chat group from its current position to a new position corresponding to the importance ranking based on the assumption that the position near the top of the screen should receive more attention from the user and therefore should be reserved for those chat groups of a higher important ranking.

Figure 4:
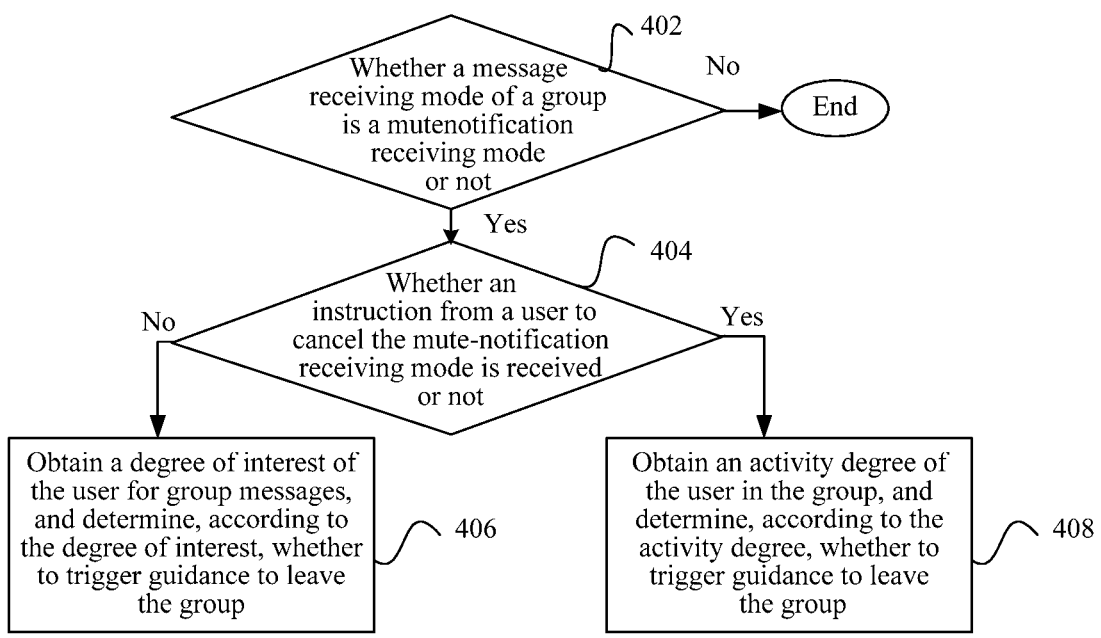
FIG. 4 is a flowchart of a chat group management method according to another embodiment.

As shown in FIG. 4, in an embodiment, a chat group management method is provided, including the following steps:

Operation 402. Detect whether a message receiving mode corresponding to a chat group is a mute-notification receiving mode, and if yes, enter operation 404; otherwise, end a process.

In this embodiment, if the message receiving mode corresponding to the chat group is not the mute-notification receiving mode, it indicates that a user wishes to view, in a timely manner, messages sent by members in the chat group, and also reflects that the user is interested in the chat group. Therefore, active guidance to leave the chat group is not needed, and the process ends.

Operation 404. Detect whether an instruction from the user to cancel the mute-notification receiving mode is received, and if yes, enter operation 408; otherwise, enter operation 406.

In this embodiment, the mute-notification receiving mode may be canceled by the user by setting the chat group, and the message receiving mode corresponding to the chat group is set to a notification receiving mode. For example, a setting interface of the chat group may be entered by means of tapping, and a message receiving mode of the chat group is changed from the mute-notification receiving mode to the notification receiving mode. Alternatively, entering a chat group message display interface may be triggered. For example, when a profile picture of the chat group is tapped and the chat group message display interface is entered for viewing the chat group messages, the instruction to cancel the mute-notification receiving mode is generated.

Operation 406. Obtain a degree of interest of the user for chat group messages, and determine, according to the degree of interest, whether to trigger guidance to leave the chat group.

In this embodiment, the degree of interest of the user for the chat group messages may be determined according to staying time after entering a message display interface of the chat group. For example, if the staying time after the user enters the message display interface of the chat group is less than a specified time threshold, it is determined to trigger guidance to leave the chat group.

Operation 408. Obtain an activity degree of the user in the chat group, and determine, according to the activity degree, whether to trigger guidance to leave the chat group.

In this embodiment, the activity degree of the user in the chat group may be determined according to a quantity of messages sent by the user in the chat group. For example, it is obtained that the quantity of messages sent by the user in the chat group is less than a specified threshold, it is determined to trigger guidance to leave the chat group.

In this embodiment, the degree of interest of the user for the chat group messages or the activity degree of the user in the chat group is obtained in different situations, so that a disturbance degree of the chat group messages for the user may be inferred, to determine whether to actively guide the user to leave the chat group, thereby avoiding information disturbance to the user resulted from a large quantity of valueless messages while reducing a pressure of a server.

In an embodiment, the operation of determining, according to the degree of interest and the activity degree, whether to trigger guidance to leave the chat group includes: obtaining a quantity of messages sent by the user to the chat group within a predetermined period of time, and determining, according to the quantity of the messages, whether to trigger guidance to leave the chat group.

Further, in an embodiment, the operation of determining, according to the degree of interest and the activity degree, whether to trigger guidance to leave the chat group further includes: detecting whether an instruction from the user to cancel the mute-notification receiving mode is received; and performing the operation of obtaining a quantity of messages sent by the user to the chat group within a predetermined period of time again if the instruction from the user to cancel the mute-notification receiving mode is not received.

In an embodiment, the operation of determining, according to the degree of interest and the activity degree, whether to trigger guidance to leave the chat group includes: detecting whether an instruction from the user to cancel the mute-notification receiving mode is received; and further obtaining staying time after entering a chat group message display interface if the instruction from the user to cancel the mute-notification receiving mode is received, and determining whether to trigger guidance to leave the chat group according to the staying time after entering the chat group message display interface.

Further, in an embodiment, the operation of determining whether to trigger guidance to leave the chat group according to the staying time after entering the chat group message display interface includes: comparing a staying time of each user visit to the chat group with a time threshold; recording a number of visits whose associated staying time is less than the time threshold; and determining to trigger guidance to leave the chat group in accordance with a determination that the number of visits exceeds a preset threshold within the predetermined period of time.

Figure 5:
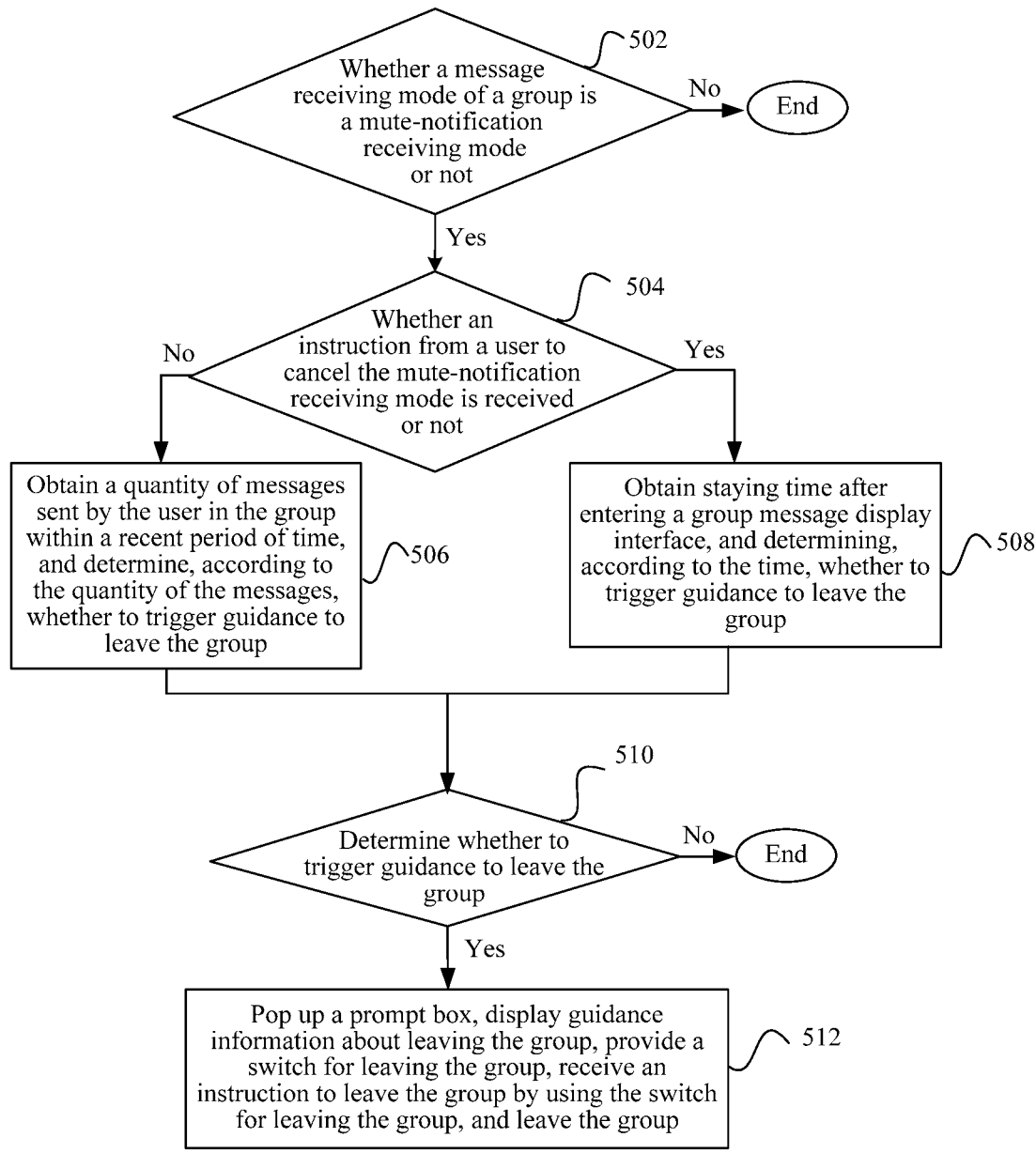
FIG. 5 is a flowchart of a chat group management method according to still another embodiment.

As shown in FIG. 5, in an embodiment, a chat group management method is provided. For example, the method is applied to the terminal shown in FIG. 1, specifically including the following steps:

Operation 502. Detect whether a message receiving mode corresponding to a chat group is a mute-notification receiving mode, and if yes, enter operation 504; otherwise, end a process.

In this embodiment, if the message receiving mode corresponding to the chat group is the mute-notification receiving mode, it indicates that the user does not view, in a timely manner, messages sent by members in the chat group. That is, the chat group does not have a high value for the user and may have information disturbance, guidance to leave the chat group does not need to be performed in this case.

Operation 504. Detect whether an instruction from the user to cancel the mute-notification receiving mode is received, and if yes, enter operation 508; otherwise, enter operation 506.

In this embodiment, the mute-notification receiving mode may be canceled by the user by setting the chat group, and the message receiving mode corresponding to the chat group is set to a notification receiving mode. For example, a setting interface of the chat group may be entered by means of tapping, and a message receiving mode of the chat group is changed from the mute-notification receiving mode to the notification receiving mode. Alternatively, entering a chat group message display interface may be triggered. For example, when a profile picture of the chat group is tapped and the chat group message display interface is entered for viewing the chat group messages, the instruction to cancel the mute-notification receiving mode is generated.

Figure 6:
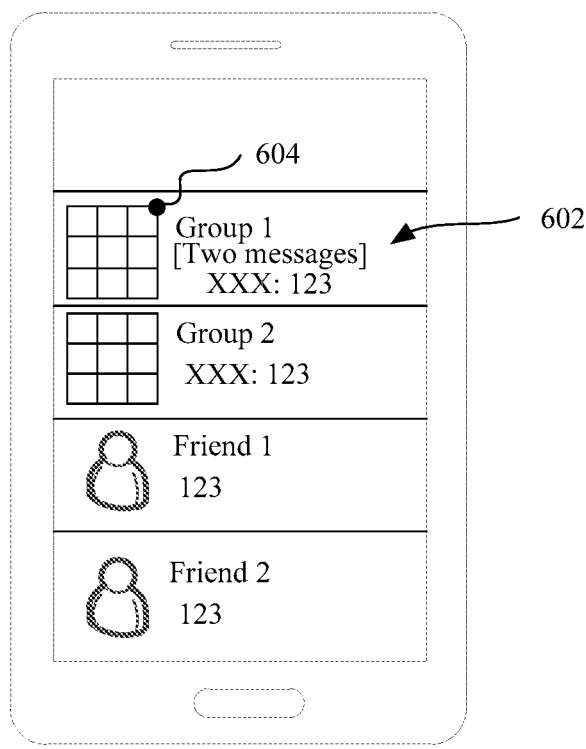
FIG. 6 is a schematic diagram of an interface displaying a chat group in a mute notification mode according to some embodiments.

As shown in FIG. 6, for example, for an instant messaging tool having a chat group function, an application interface of the instant messaging tool may display a chat group of a list of good friends. If a message receiving mode corresponding to the chat group is the mute-notification receiving mode, for example, a chat group 1 is in the mute-notification receiving mode, a profile picture corresponding to the chat group has a notification-free mark 604, and a message that is lately updated in the chat group and a quantity of messages to be viewed by the user are further displayed in a column 602 corresponding to the chat group 1. When the user taps the profile picture of the chat group, the mute notification mode is canceled and a chat group message display interface is entered.

Operation 506. Obtain a quantity of messages sent by the user to the chat group within a predetermined period of time, and determine, according to the quantity of the messages, whether to trigger guidance to leave the chat group.

In this embodiment, if the terminal does not receive the instruction from the user to cancel the mute-notification receiving mode, the terminal obtains a quantity of messages sent by the user to the chat group within a predetermined period of time, for example, obtaining a quantity of messages sent by the user in the chat group in the latest one week or one day. If the quantity of messages sent by the user to the chat group within a predetermined period of time is less than a specified threshold, it indicates that the user neither wishes to view, in a timely manner, messages sent by members in the chat group nor have a high activity degree in the chat group, it is determined to trigger guidance to leave the chat group.

Operation 508. Obtain staying time after entering a chat group message display interface, and determining, according to the time, whether to trigger guidance to leave the chat group.

In this embodiment, if the terminal receives the instruction from the user to cancel the mute-notification receiving mode by using an I/O device, the chat group message display interface is entered, and the staying time after entering the chat group message display interface is obtained. If the time is less than a specified threshold, it indicates that although the user cancels the mute-notification receiving mode, when the user has not high degree of interest for the chat group messages, it is determined to trigger guidance to leave the chat group.

Further, in an embodiment, the operation of determining whether to trigger guidance to leave the chat group according to the staying time after entering the chat group message display interface includes: comparing a staying time of each user visit to the chat group with a time threshold; recording a number of visits whose associated staying time is less than the time threshold; and determining to trigger guidance to leave the chat group in accordance with a determination that the number of visits exceeds a preset threshold within the predetermined period of time.

In this embodiment, if the user remains at the chat group message display interface for a short period of time for many times, it indicates that the user cancels the mute-notification receiving mode, but the user has not high degree of interest for the chat group messages, it is determined to trigger guidance to leave the chat group.

Operation 510. Determine whether to trigger guidance to leave the chat group, and if yes, enter operation 512; otherwise end the process.

Operation 512. Pop up a prompt box, display guidance information about leaving the chat group, provide a switch for leaving the chat group, receive an instruction to leave the chat group by using the switch for leaving the chat group, and leave the chat group.

Figure 7:
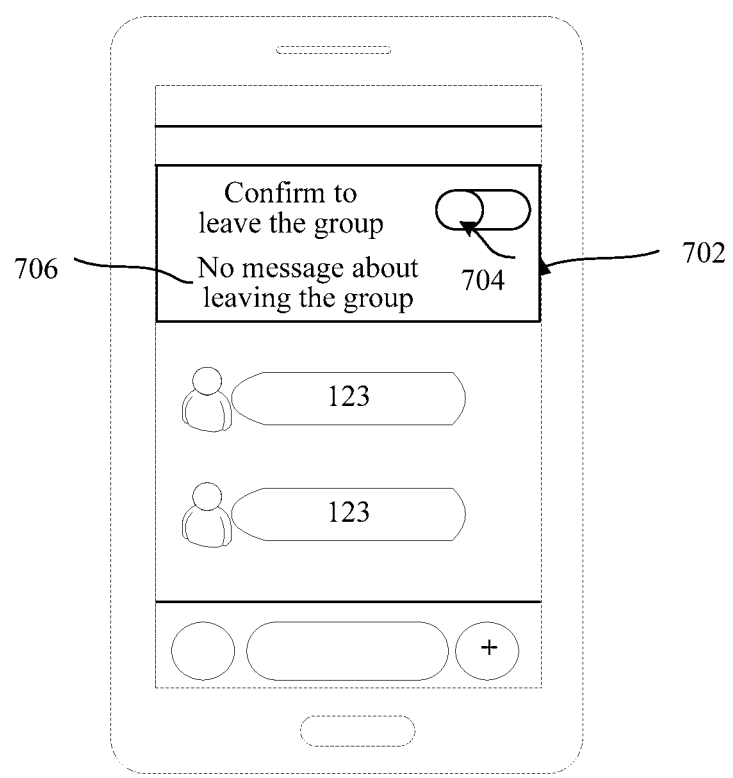
FIG. 7 is a schematic diagram of an interface displaying guidance information about leaving a chat group according to some embodiments.

In this embodiment, the guidance information about leaving the chat group includes prompt information indicating that no message about leaving the chat group is displayed after leaving the chat group. As shown in FIG. 7, after it is determined to trigger guidance to leave a chat group, a prompt box 702 pops up, to display guidance information about leaving the chat group. The guidance information about leaving the chat group includes prompt information 706 indicating not to display a message of leaving the chat group after leaving the chat group. In the prompt box 702, a switch 704 for leaving the chat group 704 is further provided, and leaving the chat group or not may be determined by using the switch 704 for leaving the chat group.

In this embodiment, when a received instruction to leave the chat group is received by using the switch for leaving the chat group, a binding relationship between the user and the chat group is terminated, and a message indicating that the user leaves the chat group cannot be displayed in the chat group.

In this embodiment, an activity degree of a user in a chat group is obtained according to a quantity of messages sent by the user in the chat group, and a degree of interest of the user for chat group messages is obtained according to staying time of entering a chat group message display interface, to determine whether the chat group messages bring about disturbance to the user, thereby determining whether to trigger guidance to leave the chat group. The user is actively guided to leave the chat group in this manner, thereby avoiding information disturbance to the user resulted from a large quantity of valueless messages while reducing a pressure of a server.

The embodiments of the present disclosure further provide a terminal. An internal structure of the terminal may correspond to the structure shown in FIG. 2. All or some of the following modules may be implemented by software, hardware, or a combination thereof.

Figure 8:
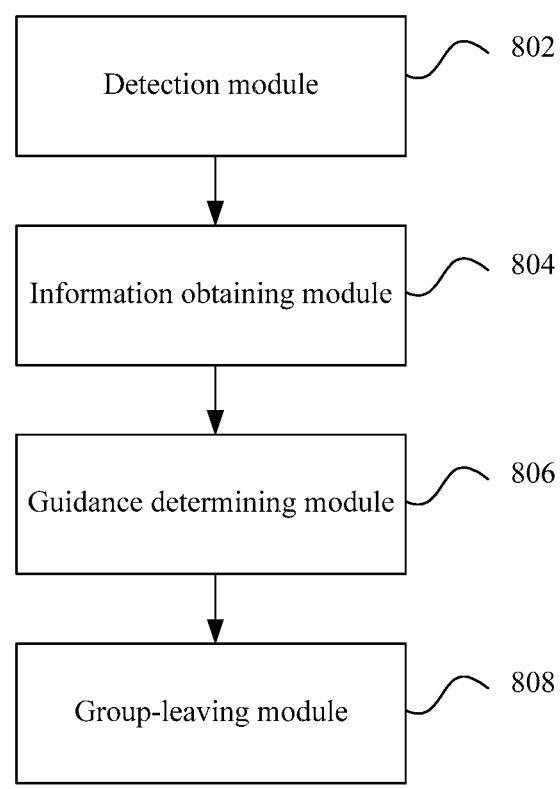
FIG. 8 is a structural block diagram of a terminal according to some embodiments.

As shown in FIG. 8, in an embodiment, a terminal in this embodiment includes:
- a detection module 802, configured to detect a message receiving mode corresponding to a chat group;
- an information obtaining module 804, configured to obtain a degree of interest of a user for chat group messages and an activity degree of the user in the chat group if the message receiving mode corresponding to the chat group is a mute-notification receiving mode;
- a guidance determining module 806, configured to determine, according to the degree of interest and the activity degree, whether to trigger guidance to leave the chat group; and
- a chat group-leaving module 808, configured to: display guidance information about leaving the chat group if it is determined to trigger guidance to leave the chat group, and leave the chat group when a determined instruction to leave the chat group is received.

In an embodiment, the information obtaining module 804 is configured to: detect whether an instruction from the user to cancel the mute-notification receiving mode is received, and if yes, obtain the degree of interest of the user for the chat group messages; otherwise, obtain the activity degree of the user in the chat group.

Figure 9:
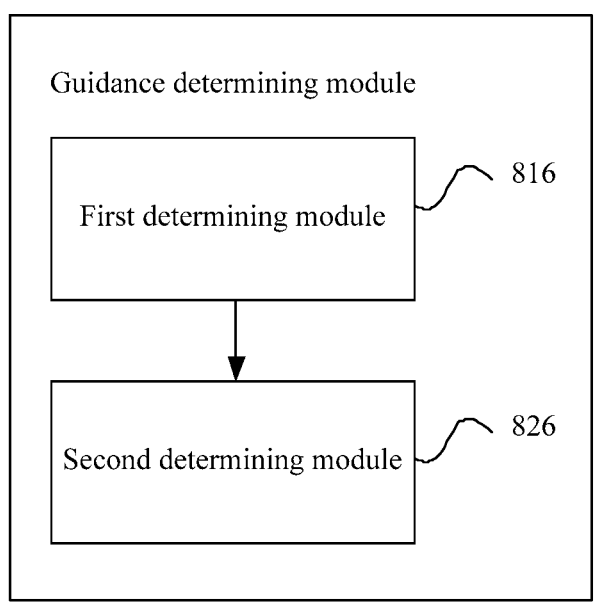
FIG. 9 is a structural block diagram of a guidance determining module according to some embodiments.

In an embodiment, as shown in FIG. 9, the guidance determining module 806 includes:
- a first determining module 816, configured to: obtain a quantity of messages sent by the user to the chat group within a predetermined period of time, and determine, according to the quantity of the messages, whether to trigger guidance to leave the chat group.

Further, in an embodiment, the first determining module 816 is further configured to: detect whether the instruction from the user to cancel the mute-notification receiving mode is received before obtaining a quantity of messages sent by the user within a recent period of time; and if the instruction from the user to cancel the mute-notification receiving mode is not received, then obtain the quantity of the messages sent by the user within the recent period of time, and determine, according to the quantity of the messages, whether to trigger guidance to leave the chat group.

In an embodiment, the guidance determining module 806 further includes:

a second determining module 826, configured to: detect whether the instruction from the user to cancel the mute-notification receiving mode is received; and if the instruction from the user to cancel the mute-notification receiving mode is received, further obtain staying time of entering a chat group message display interface, and determine, according to the staying time of entering the chat group message display interface, whether to trigger guidance to leave the chat group.

Further, in an embodiment, the second determining module 826 is further configured to: compare the staying time of entering the chat group message display interface with a time threshold; record a quantity of times that the staying time after entering the chat group message display interface is less than the time threshold; and determine to trigger guidance to leave the chat group in accordance with a determination that the number of visits exceeds a preset threshold within the predetermined period of time.

In an embodiment, the chat group-leaving module 808 is configured to: if it is determined to trigger guidance to leave the chat group, pop up a prompt box, display the guidance information about leaving the chat group by using the prompt box, and provide a switch for leaving the chat group in the prompt box, where the guidance information about leaving the chat group includes prompt information indicating that no message about leaving the chat group is displayed after leaving the chat group. The received instruction to leave the chat group is received by using the switch for leaving the chat group, to terminate a binding relationship between the user and the chat group.

A person of ordinary skill in the art may understand that all or some of the processes of the methods in the embodiments may be implemented by computer program instructing relevant hardware. The program may be stored in a computer readable storage medium. When the program runs, the processes of the methods in the embodiments are performed. The storage medium may be a non-transitory storage medium such as a magnetic disk, an optical disc, or a read-only memory (ROM), a random access memory (RAM), or the like.

Technical features of the foregoing embodiments may be combined in any combination. For brevity of description, all possible combinations of the technical features of the foregoing embodiments are not described. However, the combinations of the technical features should fall within the scope of this specification provided that there is no contradiction among the combinations.

The foregoing embodiments are merely several implementations of the present disclosure. The foregoing embodiments are described in a relatively specific and detailed manner, but should not be constructed as limiting the scope of the present disclosure. It should also be noted that, several modifications and improvements may be made by a person of ordinary skill in the art without departing from the concept of the present disclosure, and should fall within the protection scope of the present disclosure. Therefore, the protection scope of the present disclosure shall be subject to the claims.

What is claimed is:

1. A chat group management method performed at a computing device having one or more processors and memory storing one or more programs to be executed by the computing device, the method comprising:

detecting a message receiving mode corresponding to a chat group, wherein a user of the computing device is an existing member of the chat group;

in accordance with a determination that the message receiving mode corresponding to the chat group has been a mute-notification receiving mode for a predefined time period, wherein the mute-notification receiving mode means that the computing device receives a message without enabling a prompt tone on the computing device:

determining an activity degree of the user in the chat group during the predefined time period; and in accordance with a determination that the activity degree during the predefined time period is less than a first predefined threshold level, removing the user from being a member of the chat group.

2. The method according to claim 1, wherein removing the user from being a member of the first chat group comprises:

displaying guidance information about leaving the chat group; and removing the chat group from a plurality of chat groups of which the user is an existing member in response to an instruction to leave the chat group received by using an I/O device of the computing device.

3. The method according to claim 1, further comprising:

in accordance with a determination that the activity degree is higher than a second predefined threshold level that is higher than the first predefined threshold level:

removing the mute-notification receiving mode from the chat group; and setting the message receiving mode corresponding to the chat group to be a notification receiving mode.

4. The method according to claim 3, further comprising:

in accordance with a determination that the activity degree is lower than the second predefined threshold level and higher than the first predefined threshold level:

moving the chat group from its current position to a new position corresponding to the activity degree.

5. The method according to claim 1, further comprising:

in response to an instruction from the user to cancel the mute-notification receiving mode:

removing the mute-notification receiving mode from the chat group; and setting the message receiving mode corresponding to the chat group to be a notification receiving mode.

6. The method according to claim 1, wherein determining an activity degree of the user in the chat group during the predefined time period comprises:

obtaining a quantity of messages sent by the user to the chat group within the predetermined period of time, and determining a number of visits the user browses the chat group and a corresponding total amount of time the user spends browsing the chat group within the predetermined period of time.

7. A terminal, comprising:

one or more processors;

memory; and one or more programs stored in the memory that, when executed by the one or more processors to perform a plurality of operations including:

detecting a message receiving mode corresponding to a chat group, wherein a user of the computing device is an existing member of the chat group;

in accordance with a determination that the message receiving mode corresponding to the chat group has been a mute-notification receiving mode for a predefined time period, wherein the mute-notification receiving mode means that the computing device receives a message without enabling a prompt tone on the computing device:

determining an activity degree of the user in the chat group during the predefined time period; and in accordance with a determination that the activity degree during the predefined time period is less than a first predefined threshold level, removing the user from being a member of the chat group.

8. The terminal according to claim 7, wherein removing the user from being a member of the first chat group comprises:

displaying guidance information about leaving the chat group; and removing the chat group from a plurality of chat groups of which the user is an existing member in response to an instruction to leave the chat group received by using an I/O device of the computing device.

9. The terminal according to claim 8, wherein the plurality of operations further includes:

in accordance with a determination that the activity degree is higher than a second predefined threshold level that is higher than the first predefined threshold level:

removing the mute-notification receiving mode from the chat group; and setting the message receiving mode corresponding to the chat group to be a notification receiving mode.

10. The terminal according to claim 9, wherein the plurality of operations further includes:

in accordance with a determination that the activity degree is lower than the second predefined threshold level and higher than the first predefined threshold level:

moving the chat group from its current position to a new position corresponding to the activity degree.

11. The terminal according to claim 7, wherein the plurality of operations further includes:

in response to an instruction from the user to cancel the mute-notification receiving mode is received:

removing the mute-notification receiving mode from the chat group; and setting the message receiving mode corresponding to the chat group to be a notification receiving mode.

12. The terminal according to claim 7, wherein determining an activity degree of the user in the chat group during the predefined time period comprises:

obtaining a quantity of messages sent by the user to the chat group within the predetermined period of time, and determining a number of visits the user browses the chat group and a corresponding total amount of time the user spends browsing the chat group within the predetermined period of time.

13. A non-transitory computer readable storage medium storing one or more programs that, when executed by one or more processors of a terminal, cause the terminal to perform a plurality of operations including:

detecting a message receiving mode corresponding to a chat group, wherein a user of the computing device is an existing member of the chat group;

in accordance with a determination that the message receiving mode corresponding to the chat group has been a mute-notification receiving mode for a predefined time period, wherein the mute-notification receiving mode means that the computing device receives a message without enabling a prompt tone on the computing device:

determining an activity degree of the user in the chat group during the predefined time period; and in accordance with a determination that the activity degree during the predefined time period is less than a first predefined threshold level, removing the user from being a member of the chat group.

14. The non-transitory computer readable storage medium according to claim 13, wherein removing the user from being a member of the first chat group comprises:

displaying guidance information about leaving the chat group; and removing the chat group from a plurality of chat groups of which the user is an existing member in response to an instruction to leave the chat group received by using an I/O device of the computing device.

15. The non-transitory computer readable storage medium according to claim 14, wherein the plurality of operations further includes:

in accordance with a determination that the activity degree is higher than a second predefined threshold level that is higher than the first predefined threshold level:

removing the mute-notification receiving mode from the chat group; and setting the message receiving mode corresponding to the chat group to be a notification receiving mode.

16. The non-transitory computer readable storage medium according to claim 15, wherein the operation of updating the chat group's position among a plurality of chat groups in accordance with the importance ranking comprises:

in accordance with a determination that the activity degree is lower than the second predefined threshold level and higher than the first predefined threshold level:

moving the chat group from its current position to a new position corresponding to the activity degree.

17. The non-transitory computer readable storage medium according to claim 13, wherein the plurality of operations further includes:

in response to an instruction from the user to cancel the mute-notification receiving mode is received:

removing the mute-notification receiving mode from the chat group; and setting the message receiving mode corresponding to the chat group to be a notification receiving mode.

18. The non-transitory computer readable storage medium according to claim 13, wherein determining an activity degree of the user in the chat group during the predefined time period comprises:

obtaining a quantity of messages sent by the user to the chat group within the predetermined period of time, and determining a number of visits the user browses the chat group and a corresponding total amount of time the user spends browsing the chat group within the predetermined period of time.

* * * * *